J. RUDISILL.
RIDING SADDLE.
No. 18,771.                    Patented Dec. 1, 1857.
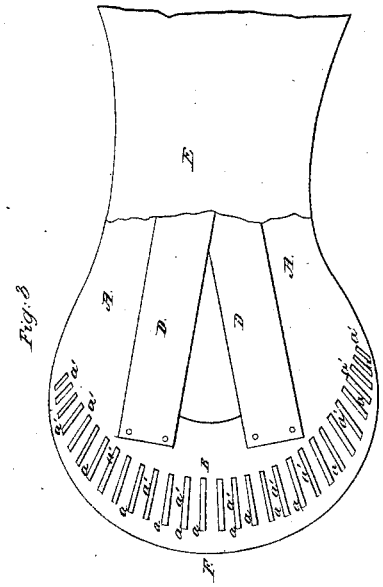
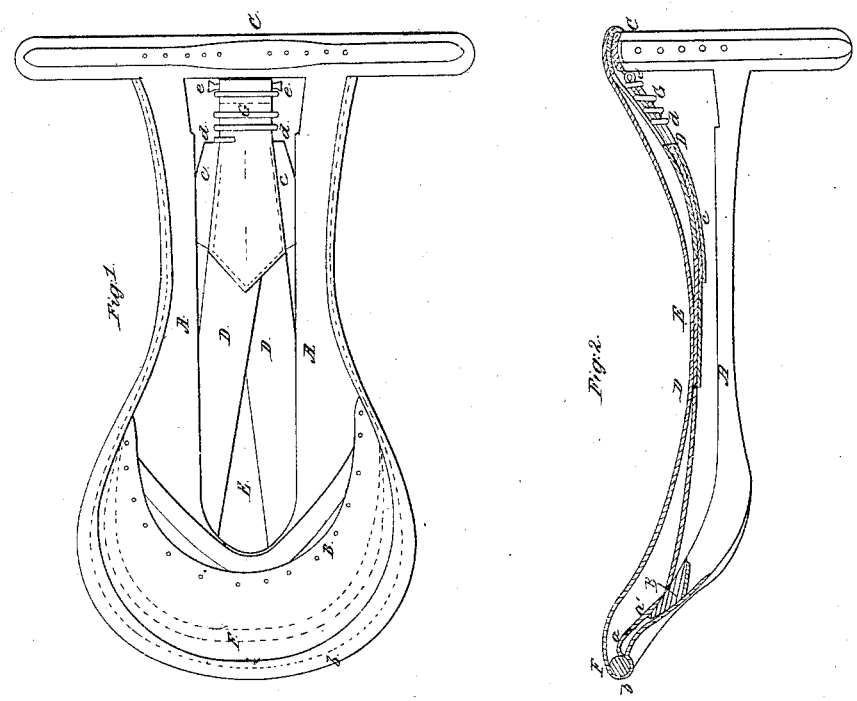

UNITED STATES PATENT OFFICE.

JOSEPH RUDISILL, OF NATCHEZ, MISSISSIPPI.

RIDING-SADDLE.

Specification of Letters Patent No. 18,771, dated December 1, 1857.

*To all whom it may concern:*

Be it known that I, JOSEPH RUDISILL, of Natchez, in the county of Adams and State of Mississippi, have invented a new and useful Improvement in Riding-Saddles; and I do hereby declare that the following is a full, clear, and exact description of the same, reference being had to the accompanying drawings, forming part of this specification, in which—

Figure 1, is an inverted view of a saddle constructed with my improvements. Fig. 2, is a vertical longitudinal section of the same. Fig. 3, is a broken top view.

Similar letters of reference in each of the several figures indicate corresponding parts.

The nature of my invention consists in the peculiar arrangement of a series of light flat springs, in a circular line, around the upper side of the cantle foundation of the tree, in combination with a coiled spring, peculiarly arranged under the head of the tree. The coiled spring being connected to the webbing or foundation of the seat, and the flat spring to the seat, as presently described; the coiled spring allows the webbing or foundation to give toward the cantle and the flat spring allows the outer covering or seat to yield or give toward the head. By this arrangement a more perfect spring seat saddle than those in use is secured, said seat yielding when the weight of the rider falls upon it, and again regaining its form when the weight of the rider rises from upon it, which changes are continually occurring in horse back riding while pacing or trotting.

To enable others skilled in the art to make and use my invention, I will proceed to describe its construction and operation.

A, A, represents the side bars of the wooden tree, B, the wooden foundation of the cantle, F, and C, the head of the same. D, is the webbing or foundation of the seat and E the seat.

Around the upper side of the wooden foundation of the cantle are arranged a series of light springs $a$, $a$, Figs. 2 and 3. The inner ends of these springs are fastened to the wooden foundation B, of the cantle F, and the outer curved ends butt against a circular strop or shoulder $b$, of the cantle F, and when the weight comes upon the seat E, they are caused to bend in form of a bow at $a'$, and thus give elasticity to the seat, and ease to the rider. G, is a coiled spring arranged under the head of the tree. This spring is fitted loosely over the loose front end of the webbing or foundation, and is prevented from shifting its position by the piece of leather $c$, forming a shoulder at $b$, but caused to contract, when weight comes upon the webbing through the descent of the seat, by means of a pin $e$, passed through the front end of the webbing or foundation of the seat as shown. By attaching the webbing or foundation to this spring it is rendered elastic with the seat, and thus while the cantle yields and moves toward the head of the saddle, by reason of the introduction of the circle of flat springs $a$, the webbing or foundation, when pressed down by the seat, yields and moves toward the cantle by reason of the introduction of the coiled spring G.

I do not claim a spring seat saddle broadly, neither do I claim having the foundation of the cantle hinged to the tree and rendered capable of yielding by a rubber spring, as in the patent of Seth Ward, 1857; neither do I claim broadly a spring arranged at the head of the tree for assisting in rendering the seat elastic; but What I do claim as my invention, and desire to secure by Letters Patent, is—

The peculiar arrangement of a series of light, flat, springs $a$, $a$, in a circular line around the upper side of the cantle foundation B, of the tree A, A, for use in combination with the coiled spring G, as peculiarly arranged under the head C, of the tree, said springs being actuated simultaneously by means of the seat E, and webbing or foundation D, substantially as and for the purposes set forth.

JOSEPH RUDISILL.

Witnesses:
W. W. WILKINS,
C. M. BENBROOK.